Patented July 26, 1927.

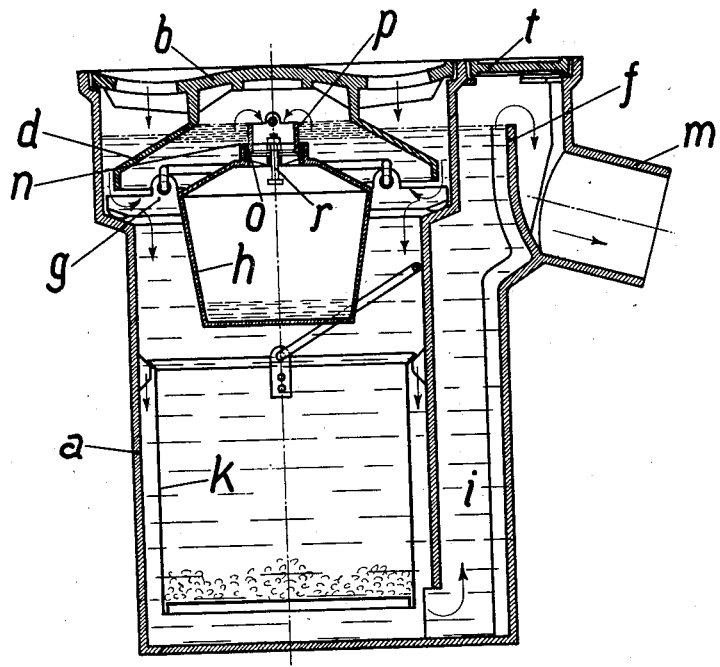

1,636,866

UNITED STATES PATENT OFFICE.

ADOLF KUTZER, OF LEIPZIG, STUNZ, GERMANY.

BENZINE AND OIL SEPARATOR.

Application filed February 26, 1926, Serial No. 90,809, and in Germany March 6, 1925.

This invention relates to sink-water traps for waste water of such type which are fitted, besides the mud box, with means for separating specifically lighter liquids, especially oil and benzine.

In sink-water traps of this type the overflow edge for the specifically lighter liquids must be situated considerably higher than the overflow for the waste water in order that the flowing over of waste water into the collecting chambers for the oil and benzine be absolutely prevented.

The lighter liquids, prior to arriving at the higher overflow, must therefore equalize the difference of height between the overflow for the waste water and the oil-overflow so that a thick layer of benzine and oil stands permanently over the waste water in the sink-water trap; this layer having to be removed by skimming prior to the lifting out of the mud box to be emptied or cleaned, as otherwise considerable quantities of oil and benzine might flow over into the channel for the waste water and get into the sewage water drain. To avoid the generation of explosive gases in the drain the admission of benzine and oil must be avoided.

To ensure in a reliable manner that, on the one hand, the overflowing of specifically lighter liquids from the sink-water tap into the channel be prevented and, on the other hand, no specifically lighter liquids can flow with the waste water into the sewage water drains, the overflow edge for the specifically lighter liquids is conveniently heightened by a sluice-insertion adapted to be removed of its seat situated in the same horizontal plane as the overflow for the waste water so that by lifting the sluice insertion the thick oil layer floating in the sink-water trap on the top of the water column, can flow into the collector vessel in the water current.

An embodiment of the invention is shown, by way of example, in the accompanying drawings, in which The figure shows in longitudinal section a sink-water trap with collector for the specifically lighter liquids built in.

The trap $a$ is closed at the top end by a grate-like lid $b$ on the lower surface of which a dip bell $d$ is fixed. Underneath the dip bell $d$ a vessel $h$ is suspended on cross arms $g$ in the trap $a$, a mud box $k$ being arranged under the vessel $h$. The sewage water flows into the tubular outflow socket from a deeper point of trap $a$ through the side channel $i$ formed by a vertical partition serving as overflow (Fig. 1).

The inlet $n$ of the oil vessel $h$ has a carefully worked seat $o$ for a sluice insertion $p$ which has the shape of a hollow cylinder so that its top edge forms the overflow for the specifically lighter liquids to be collected in vessel $h$. The sluice insertion $p$ is guided in the seat $o$ by means of a bolt $r$ in such a manner that it can be lifted off its seat to liberate the overflow edge $n$ so that the oil layer which has collected on top of the water underneath the dip bell $d$ can flow into the vessel $h$.

Owing to the arrangement of the sluice insertion $p$ the overflow edge $n$ of vessel $h$ can be situated in a lower plane than the overflow edge $f$ for the reason that the sluice insertion rises just prior to the emptying of vessel $h$ so that it has nothing when a small quantity of sewage water flows into the vessel $h$ together with the oil layer, it being much more important to prevent oil or benzine from getting into the drain net together with the sewage water.

In the form of construction shown in Fig. 2 there is no oil collecting vessel in the trap $a$ an outflow tube $s$ for the specifically lighter liquids being arranged at the side of the trap through which outflow tube the specifically lighter liquids are conducted to a vessel arranged at a certain distance from the trap, a seat $o$ and a sluice insertion $p$ being arranged on the top end of this outflow tube $s$. The lateral chamber in which the oil outflow $s$ is arranged is closed by a lid $t$ so that after the lid has been removed the sluice insertion $p$ can be lifted off its seat $o$ in a similar manner as described with reference to Fig. 1 in order, before the mud box $k$ is removed from trap $a$, to be emptied.

If, for local conditions a sink-water trap cannot be arranged in a room protected against frost a cylindrical extension $u$ is preferably mounted on the packing edges of the trap $a$, said cylindrical extension being closed at the top end either by a grate-like lid $b$ or by a cover plate $v$ (Fig. 3) a tubular inflow $w$ being in that case arranged at any convenient height underneath the cover $v$. In the cylindrical top part $u$ vertical shafts are arranged above the overflow channel $i$ and above the oil outflow pipe $s$, said vertical shafts being closed at the top end each by a lid $t$ so that the sluice insertion $p$ and the overflow channel $i$ may be made accessible. The dip bell $d$ is mounted in the lower end of the cylindrical top part $u$.

I claim:—

1. A sink-water trap for separating specifically lighter liquids, such as oil and benzine, from the sewage water, comprising in combination with the trap proper having a lid and also an overflow edge in one side, a dip bell downwardly projecting from the lid of said trap, a downwardly directed vertical partition in said trap separating the overflow edge of said trap from said dip bell said partition ending a certain distance above the bottom of said trap, a mud box in the lower portion of said trap, cross arms on the bottom edge of said dip bell, a vessel suspended on said cross arms designed for collecting the specifically lighter liquids and having its open top edge situated approximately on the same plane as said overflow edge of the trap, and a sluice insertion adjustably mounted in the open top end of said vessel for increasing the height of the layer of specifically lighter liquids under said dip bell.

2. A sink water trap for separating specifically lighter liquids, such as oil and benzine, from the sewage water, comprising in combination with the trap proper having a lid and also an overflow edge in one side, a dip bell downwardly projecting from the lid of said trap, a downwardly directed vertical partition in said trap separating the overflow edge of said trap from said dip bell said partition ending a certain distance above the bottom of said trap, a mud box in the lower portion of said trap, cross arms on the bottom edge of said dip bell, a vessel suspended on said cross arms designed for collecting the specifically lighter liquids and having its open top edge situated approximately on the same plane as said overflow edge of the trap and said open top edge forming a carefully worked seat, a sluice insertion adjustably mounted on said seat for increasing the height of the layer of specifically lighter liquids under said dip bell, and a vertical bolt for guiding said sluice insertion on said seat so that said sluice insertion can be lifted sufficiently to allow the specifically lighter liquids collected under said dip bell to flow into said vessel.

In testimony whereof I affix my signature.

ADOLF KUTZER.